United States Patent
Hsiao et al.

(10) Patent No.: US 8,120,874 B2
(45) Date of Patent: Feb. 21, 2012

(54) PERPENDICULAR WRITE HEAD HAVING A MODIFIED WRAP-AROUND SHIELD TO IMPROVE OVERWRITE, ADJACENT TRACK INTERFERENCE AND MAGNETIC CORE WIDTH DEPENDENCE ON SKEW ANGLE

(75) Inventors: Wen-Chien David Hsiao, San Jose, CA (US); Quan-chiu Harry Lam, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 1088 days.

(21) Appl. No.: 11/966,023

(22) Filed: Dec. 28, 2007

(65) Prior Publication Data

US 2009/0168240 A1 Jul. 2, 2009

(51) Int. Cl.
*G11B 5/23* (2006.01)
*G11B 5/10* (2006.01)

(52) U.S. Cl. .............. 360/119.04; 360/125.25
(58) Field of Classification Search ........... 360/125.25, 360/119.04, 119.02, 119.01, 123.12, 125.09, 360/125.13, 125.3
See application file for complete search history.

(56) References Cited

U.S. PATENT DOCUMENTS

| | | | | |
|---|---|---|---|---|
| RE33,949 E | 6/1992 | Mallary et al. | | 360/110 |
| 6,738,233 B2 | 5/2004 | Khizroev et al. | | 360/319 |
| 6,954,340 B2 | 10/2005 | Shukh et al. | | 360/317 |
| 7,227,720 B2 | 6/2007 | Sasaki et al. | | 360/126 |
| 7,239,478 B1 | 7/2007 | Sin et al. | | 360/126 |
| 7,551,396 B2 * | 6/2009 | Hsu et al. | | 360/125.3 |
| 7,894,159 B2 * | 2/2011 | Lengsfield et al. | | 360/125.03 |
| 7,969,684 B2 * | 6/2011 | Le et al. | | 360/125.3 |
| 2002/0071208 A1 | 6/2002 | Batra et al. | | 360/125 |
| 2005/0111138 A1 | 5/2005 | Yamakawa et al. | | 360/126 |
| 2006/0044682 A1 | 3/2006 | Le et al. | | 360/126 |
| 2006/0203384 A1 | 9/2006 | Maruyama et al. | | 360/126 |
| 2006/0245108 A1 | 11/2006 | Hsu et al. | | 360/125 |
| 2006/0245109 A1 | 11/2006 | Hsu et al. | | 360/126 |
| 2007/0035885 A1 | 2/2007 | Im et al. | | 360/317 |
| 2007/0115584 A1 | 5/2007 | Balamane et al. | | 360/126 |
| 2007/0230046 A1 * | 10/2007 | Le et al. | | 360/126 |
| 2009/0154013 A1 * | 6/2009 | Sugiyama et al. | | 360/125.3 |
| 2010/0232062 A1 * | 9/2010 | Gao et al. | | 360/123.12 |
| 2010/0328816 A1 * | 12/2010 | Guan et al. | | 360/123.12 |

FOREIGN PATENT DOCUMENTS

| | | |
|---|---|---|
| JP | 2007035165 | 2/2007 |
| JP | 200943344 A * | 2/2009 |
| JP | 2010061735 A * | 3/2010 |

OTHER PUBLICATIONS

Okada et al., "Narrow Track Fabrication Process for Perpendicular Recording Heads" 2007 Institution of Electrical Engineers Aug. 5, 2001.
Hsu et al., "Challenges for Perpendicular Write Heads at High Recording Density" IEEE Transactions on Magnetics, vol. 43, No. 2, Feb. 2007.

* cited by examiner

*Primary Examiner* — Julie Anne Watko
(74) *Attorney, Agent, or Firm* — Zilka-Kotab, PC

(57) ABSTRACT

A magnetic write head for perpendicular magnetic data recording. The write head includes an wrap around trailing shield structure for improved write field strength, reduced skew related adjacent track interference and magnetic core width. The trailing wrap around shield includes a side shield that is separated from sides of the write pole by a side gap that is narrower near the leading edge of the write pole and wider near the trailing edge of the write pole.

19 Claims, 7 Drawing Sheets

PERPENDICULAR WRITE HEAD HAVING A MODIFIED WRAP-AROUND SHIELD TO IMPROVE OVERWRITE, ADJACENT TRACK INTERFERENCE AND MAGNETIC CORE WIDTH DEPENDENCE ON SKEW ANGLE

FIELD OF THE INVENTION

The present invention relates to perpendicular magnetic recording and more particularly to a magnetic write head having a trailing, wrap-around shield having a side gap thickness that is larger at a trailing edge of the write pole and narrower at a leading edge of the write pole.

BACKGROUND OF THE INVENTION

The heart of a computer's long term memory is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider toward the surface of the disk, and when the disk rotates, air adjacent to the disk moves along with the surface of the disk. The slider flies over the surface of the disk on a cushion of this moving air. When the slider rides on the air bearing, the write and read heads are employed for writing magnetic transitions to and reading magnetic transitions from the rotating disk. The read and write heads are connected to processing circuitry that operates according to a computer program to implement the writing and reading functions.

The write head has traditionally included a coil layer embedded in first, second and third insulation layers (insulation stack), the insulation stack being sandwiched between first and second pole piece layers. A gap is formed between the first and second pole piece layers by a gap layer at an air bearing surface (ABS) of the write head and the pole piece layers are connected at a back gap. Current conducted to the coil layer induces a magnetic flux in the pole pieces which causes a magnetic field to fringe out at a write gap at the ABS for the purpose of writing the aforementioned magnetic transitions in tracks on the moving media, such as in circular tracks on the aforementioned rotating disk.

In recent read head designs, a GMR or TMR sensor has been employed for sensing magnetic fields from the rotating magnetic disk. The sensor includes a nonmagnetic conductive layer, or barrier layer, sandwiched between first and second ferromagnetic layers, referred to as a pinned layer and a free layer. First and second leads are connected to the sensor for conducting a sense current therethrough. The magnetization of the pinned layer is pinned perpendicular to the air bearing surface (ABS) and the magnetic moment of the free layer is located parallel to the ABS, but free to rotate in response to external magnetic fields. The magnetization of the pinned layer is typically pinned by exchange coupling with an antiferromagnetic layer.

The thickness of the spacer layer is chosen to be less than the mean free path of conduction electrons through the sensor. With this arrangement, a portion of the conduction electrons is scattered by the interfaces of the spacer layer with each of the pinned and free layers. When the magnetizations of the pinned and free layers are parallel with respect to one another, scattering is minimal and when the magnetizations of the pinned and free layer are antiparallel, scattering is maximized. Changes in scattering alter the resistance of the spin valve sensor in proportion to cos $\theta$, where $\theta$ is the angle between the magnetizations of the pinned and free layers. In a read mode the resistance of the spin valve sensor changes proportionally to the magnitudes of the magnetic fields from the rotating disk. When a sense current is conducted through the spin valve sensor, resistance changes cause potential changes that are detected and processed as playback signals.

In order to meet the ever increasing demand for improved data rate and data capacity, researchers have recently been focusing their efforts on the development of perpendicular recording systems. A traditional longitudinal recording system, such as one that incorporates the write head described above, stores data as magnetic bits oriented longitudinally along a track in the plane of the surface of the magnetic disk. This longitudinal data bit is recorded by a fringing field that forms between the pair of magnetic poles separated by a write gap.

A perpendicular recording system, by contrast, records data as magnetizations oriented perpendicular to the plane of the magnetic disk. The magnetic disk has a magnetically soft underlayer covered by a thin magnetically hard top layer. The perpendicular write head has a write pole with a very small cross section and a return pole having a much larger cross section. A strong, highly concentrated magnetic field emits from the write pole in a direction perpendicular to the magnetic disk surface, magnetizing the magnetically hard top layer. The resulting magnetic flux then travels through the soft underlayer, returning to the return pole where it is sufficiently spread out and weak that it will not erase the signal recorded by the write pole when it passes back through the magnetically hard top layer on its way back to the return pole.

SUMMARY OF THE INVENTION

The present invention provides a magnetic write head for perpendicular magnetic data recording. The write head includes a wrap-around, trailing shield structure for improved write field strength, reduced skew related adjacent track interference and magnetic core width. The trailing strap around shield includes a side shield that is separated from sides of the write pole by a side gap that is narrower near the leading edge of the write pole and wider near the trailing edge of the write pole.

The trailing portion of the write pole provides the primary contribution to writing to the magnetic medium. The leading edge, which contributes less to actual writing, contributes to undesirable adjacent track interference and skew related increases in magnetic core width.

The wider side gap near the trailing edge of the write pole advantageously promotes a strong write field at the trailing edge of the write pole by minimizing the magnetic flux loss to the shield structure at the trailing edge.

The narrower side gap near the leading edge advantageously reduces adjacent track interference and skew related magnetic core width increase contributions from the leading edge of the write pole, thereby maximizing magnetic write head performance. The novel shield structure thereby provides an optimal balance of write field strength, field gradient, and minimal adjacent track interference and magnetic core width.

These and other features and advantages of the invention will be apparent upon reading of the following detailed description of preferred embodiments taken in conjunction with the Figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

DETAILED DESCRIPTION OF THE EMBODIMENTS

The following description is of the best embodiments presently contemplated for carrying out this invention. This description is made for the purpose of illustrating the general principles of this invention and is not meant to limit the inventive concepts claimed herein.

Figure 1:
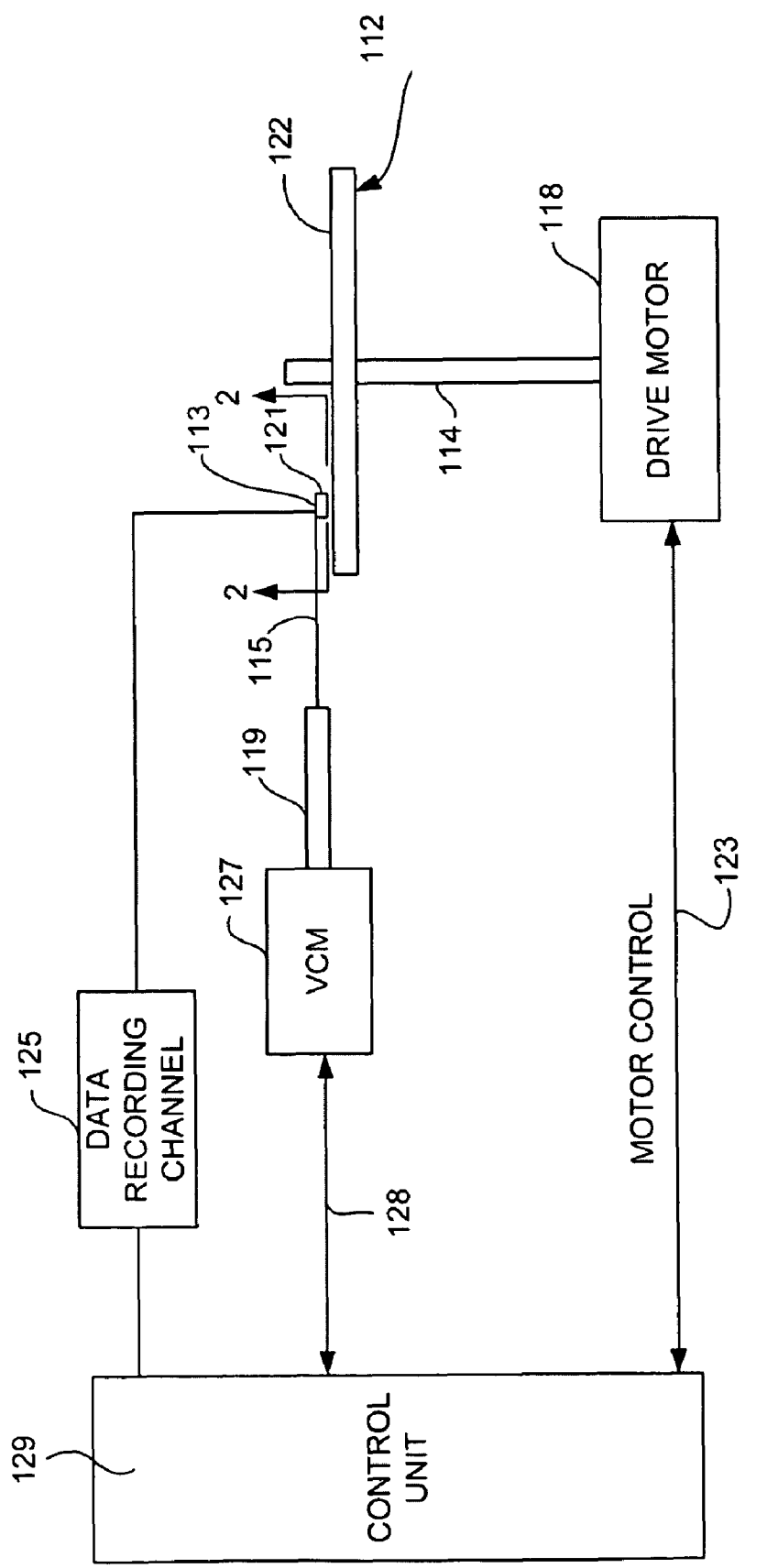
FIG. 1 is a schematic illustration of a disk drive system in which the invention might be embodied.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, slider 113 moves radially in and out over the disk surface 122 so that the magnetic head assembly 121 may access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
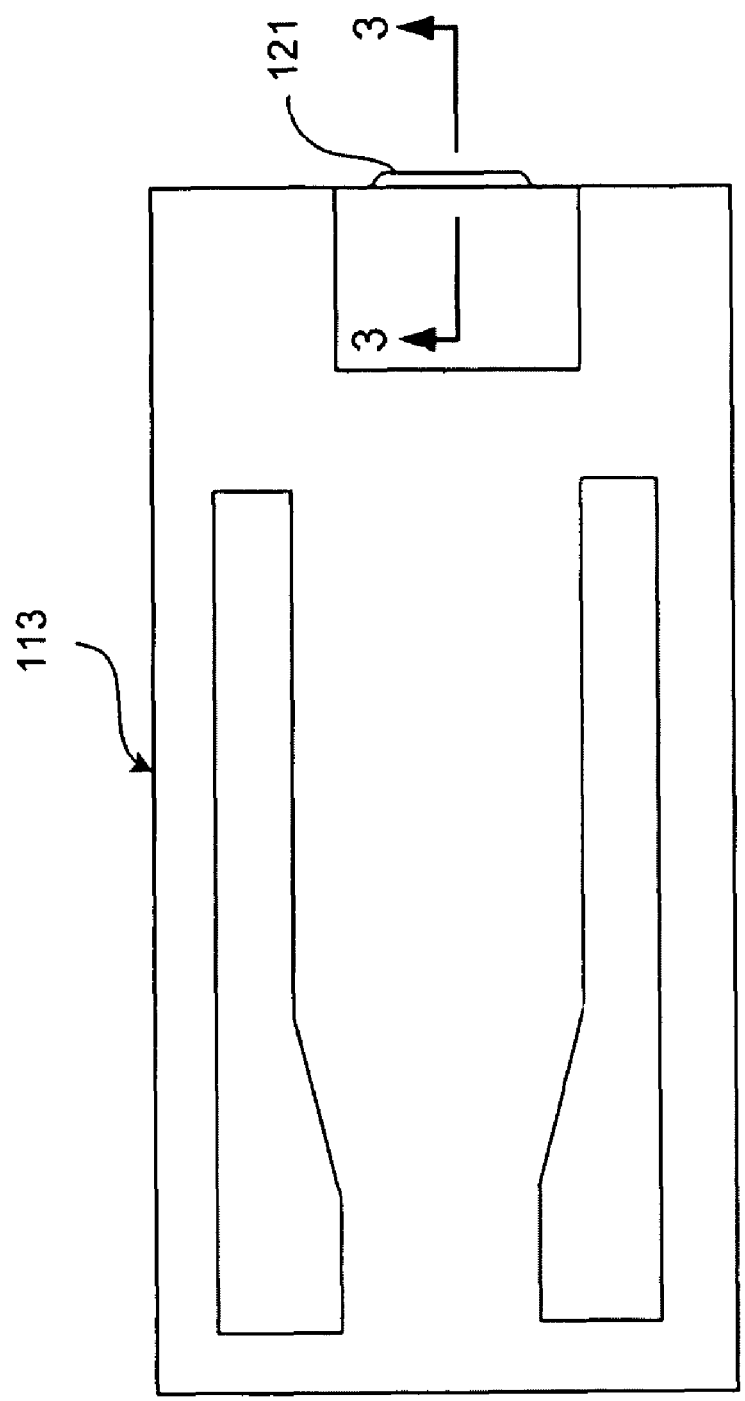
FIG. 2 is an ABS view of a slider, taken from line 2-2 of FIG. 1, illustrating the location of a magnetic head thereon.

With reference to FIG. 2, the orientation of the magnetic head 121 in a slider 113 can be seen in more detail. FIG. 2 is an ABS view of the slider 113, and as can be seen the magnetic head including an inductive write head and a read sensor, is located at a trailing edge of the slider. The above description of a typical magnetic disk storage system, and the accompanying illustration of FIG. 1 are for representation purposes only. It should be apparent that disk storage systems may contain a large number of disks and actuators, and each actuator may support a number of sliders.

Figure 3:
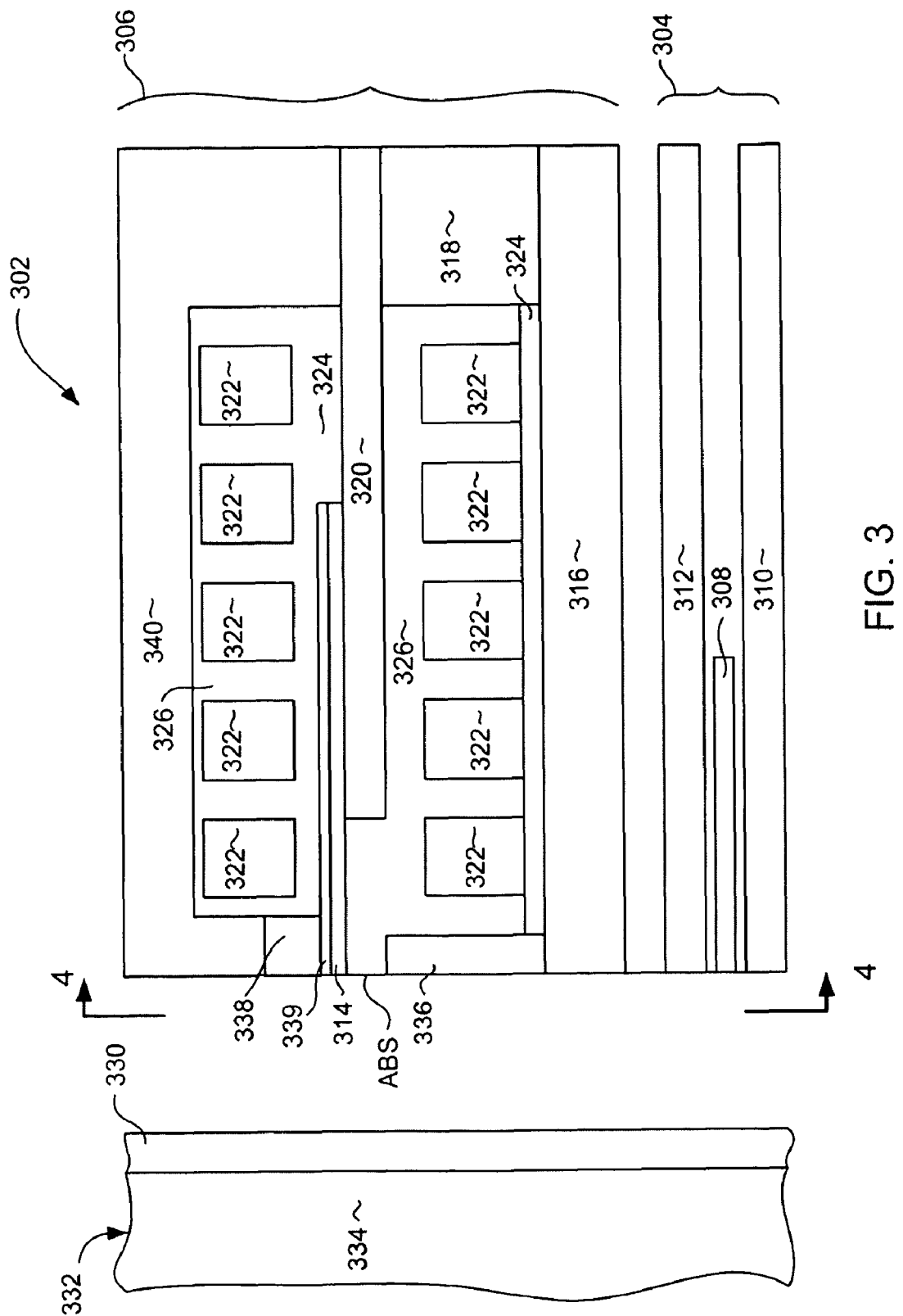
FIG. 3 is a cross sectional view of a magnetic head, taken from line 3-3 of FIG. 2 and rotated 90 degrees counterclockwise, of a magnetic write head according to an embodiment of the present invention.

With reference now to FIG. 3, the invention can be embodied in a magnetic head 302. The magnetic head 302 includes a read head 304 and a write head 306. The read head 304 includes a magnetoresistive sensor 308, which can be a GMR, TMR, or some other type of sensor. The magnetoresistive sensor 308 is located between first and second magnetic shields 310, 312.

The write head 306 includes a magnetic write pole 314 and a magnetic return pole 316. The write pole 314 can be formed upon a magnetic shaping layer 320, and a magnetic back gap layer 318 magnetically connects the write pole 314 and shaping layer 320 with the return pole 316 in a region removed from the air bearing surface (ABS). A write coil 322 (shown in cross section in FIG. 3A) passes between the write pole and shaping layer 314, 320 and the return pole 316, and may also pass above the write pole 314 and shaping layer 320. The write coil can be a helical coil or can be one or more pancake coils. The write coil 322 can be formed upon an insulation layer 324 and can be embedded in a coil insulation layer 326 such as alumina and or hard baked photoresist.

In operation, when an electrical current flows through the write coil 322. A resulting magnetic field causes a magnetic flux to flow through the return pole 316, back gap 318, shaping layer 320 and write pole 314. This causes a magnetic write field to be emitted from the tip of the write pole 314 toward a magnetic medium 332. The write pole 314 has a cross section at the ABS that is much smaller than the cross section of the return pole 316 at the ABS. Therefore, the magnetic field emitting from the write pole 314 is sufficiently dense and strong that it can write a data bit to a magnetically hard top layer 330 of the magnetic medium 332. The magnetic flux then flows through a magnetically softer under-layer 334, and returns back to the return pole 316, where it is sufficiently spread out and weak that it does not erase the data bit recorded by the write head 314.

In order to increase write field gradient, and therefore increase the speed with which the write head 306 can write data, a trailing, wrap-around magnetic shield 338 can be provided. The trailing, wrap-around magnetic shield 338 is separated from the write pole by a non-magnetic write gap 339, and may be connected with the shaping layer 320 and/or back gap 318 by a trailing return pole 340. The trailing shield 338 attracts the magnetic field from the write pole 314, which slightly cants the angle of the magnetic field emitting from the write pole 314. This canting of the write field increases the speed with which write field polarity can be switched by increasing the field gradient.

Figure 4:
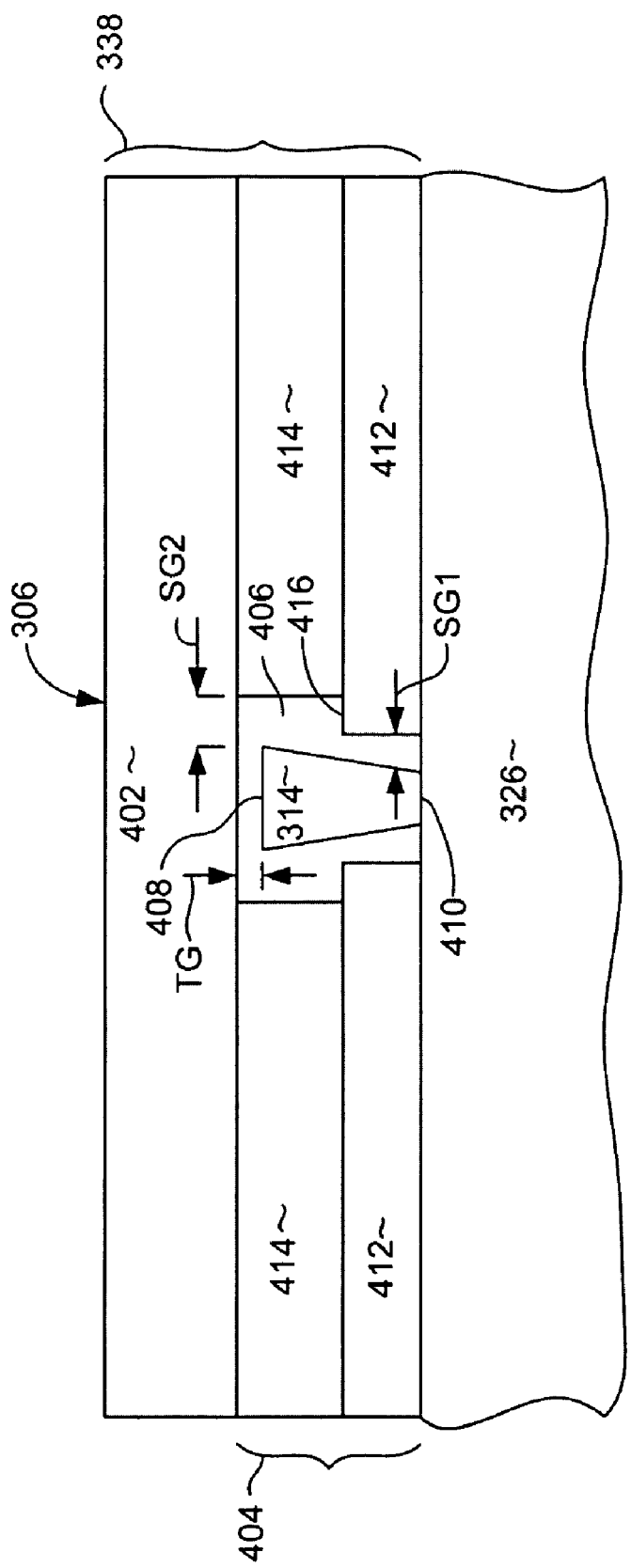
FIG. 4 is an air bearing surface view of a portion of a write head illustrating a trailing wrap around magnetic shield according to an embodiment of the invention.

With reference to FIG. 4, an air bearing surface view of a possible implementation of the invention shows the trailing, wrap-around shield with a trailing shield portion 402, and a side shield portion 404. The shield 338 is separated from the write pole 314 by non-magnetic material 406 that can actually be constructed as various layers of a material such as alumina, and can include layer of other non-magnetic materials.

The trailing portion 402 of the shield 338 is separated from a trailing edge 408 of the write pole 314 by a trailing gap TG. The size of this trailing gap is chosen to provide a desired amount of write field gradient increase, without losing too much write field from flux leakage to the trailing shield portion 402.

The side shield portions 404 prevent adjacent track interference (ATI) by preventing stray fields (such as from the write coil or magnetic structures of the write head) from affecting the magnetic medium 332 (FIG. 3). The side shield portion 404 also reduces the Magnetic Core Width (MCW), reducing skew related increases in MCW at high skew angles.

As mentioned above, the write pole 314 has a trailing edge 408. The write pole 314 also has a leading edge 410 opposite the trailing edge 408, and has first and second laterally opposed sides 412, 414 that each extend from the leading edge 410 to the trailing edge 408. As can be seen, the write pole is preferably tapered so that the write pole 314 is wider at the trailing edge 408 than at the leading edge 410, giving the write pole 314 a trapezoidal shape. Writing primarily occurs at the trailing edge 408, and the tapered, trapezoidal shape of the write pole 314 helps to reduce skew related Adjacent Track Interference (ATI) and to reduce the Magnetic Core Width (MCW).

In order to further reduce skew related Adjacent Track Interference (ATI) and Magnetic Core Width (MCW) while also maximizing write field at the trailing edge 408 (which as mentioned above is the location where writing primarily occurs), the side shield portion 404 of the wrap-around magnetic shield 338 has a varying side gap thickness, having a small side gap SG1 near the leading edge 410 and a larger side gap SG2 near the trailing edge 408. Accordingly, the side shield portion 404 has a first side shield layer 412 and a second side shield layer 414, the second side shield layer 414 being formed over the first side shield layer so that the second side shield layer 414 is located in a trailing direction relative to the first side shield layer 414 (i.e. the second layer 414 trails the first layer 412). The first side shield portion 412 extends closer to the write pole 314 than the second side shield portion 414 allowing the side shield 404 to define a side gap having a narrower side gap SG1 near the leading edge 410 of the write pole and a wider side gap SG2 near the trailing edge of the write pole 314 as discussed above. Therefore, as can be seen, the shield portions 402, 404 defined a stepped structure 416 adjacent to the write pole 314.

The narrower side gap SG1 near the leading edge 410 allows the side shield 404 to provide improved protection against stray field adjacent track writing. Also, since the leading edge 410 of the write pole does not contribute significantly to writing, but does contribute to skew related ATI and MCW, the decreased side gap thickness SG1 near the leading edge 410 decreases this contribution to ATI and MCW of the leading edge portion 410 of the write pole 314.

Figure 5:
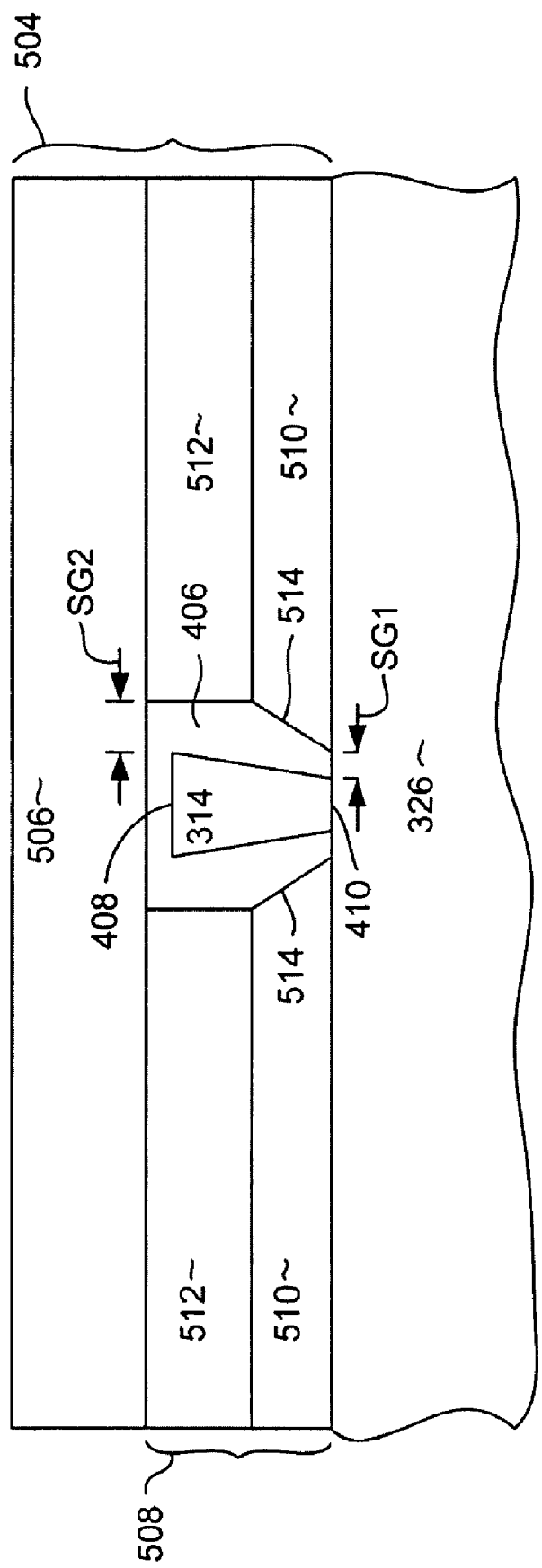
FIG. 5 is an air bearing surface view of a portion of a write head illustrating a trailing wrap around magnetic shield according to an alternate embodiment of the invention.

With reference now to FIG. 5, a write head 502 according to another embodiment of the invention is described, as viewed from the air bearing surface. The write head 502 includes a trailing, wrap-around shield 504 having a trailing shield portion 506 and a side shield portion 508. As with the previously described embodiment, the side shield 408 has a first (or leading) portion 510 and a second (or trailing) portion 512 that together define a first side gap width SG1 at the leading edge 410 that is smaller than the second side gap SG2 at the trailing edge 408 of the write pole 314. However, as can be seen, in FIG. 5, the first (or leading) side shield portion has a tapered inner edge 514. Therefore rather than defining a step 416 as described in FIG. 4, the leading shield portion 510 defines side gap that varies, becoming increasingly narrower toward the leading edge 410 of the write pole 314.

Figure 6:
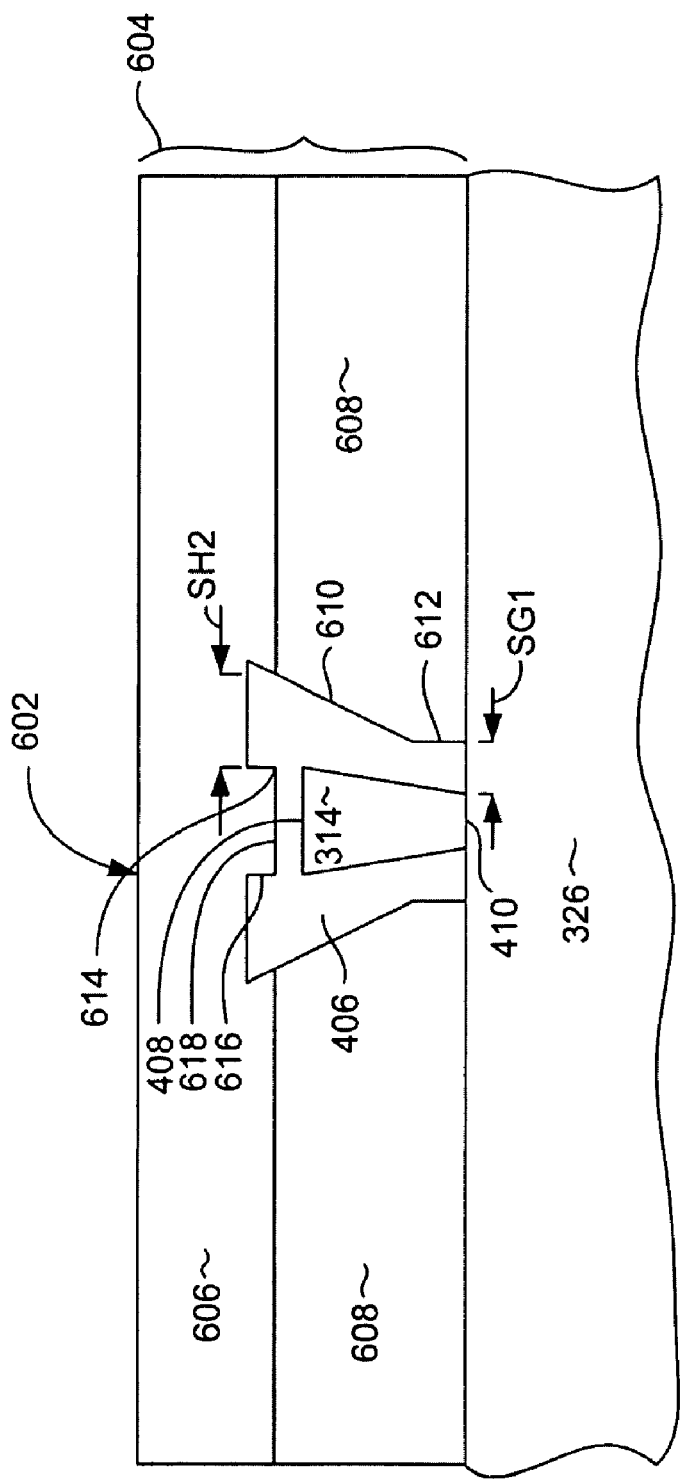
FIG. 6 is an air bearing surface view of a portion of a write head illustrating a trailing wrap around magnetic shield according to yet another embodiment of the invention.

With reference now to FIG. 6, according to another embodiment of the invention, a write head 602 has a trailing wrap-around shield 604 with a trailing portion 606 and a side shield portion 608. The side shield portion has tapered inner edge 610 that forms a varying side gap that varies from a wider side gap SG2 at the trailing edge to a narrower side gap SG1 closer to the leading edge 410. In this embodiment, the tapered inner edge 610 begins to taper at the trailing edge 408 and may also optionally include a non-tapered portion 612 near the leading edge 410. In addition, the trailing shield portion 606 may have a notched structure 614 resulting wherein the side shield gap portions form "rabbit ear" structures 616 that extend further in the trailing direction than the edge 618 of the trailing shield 606 adjacent to trailing edge 408 of the write pole 314.

Figure 7:
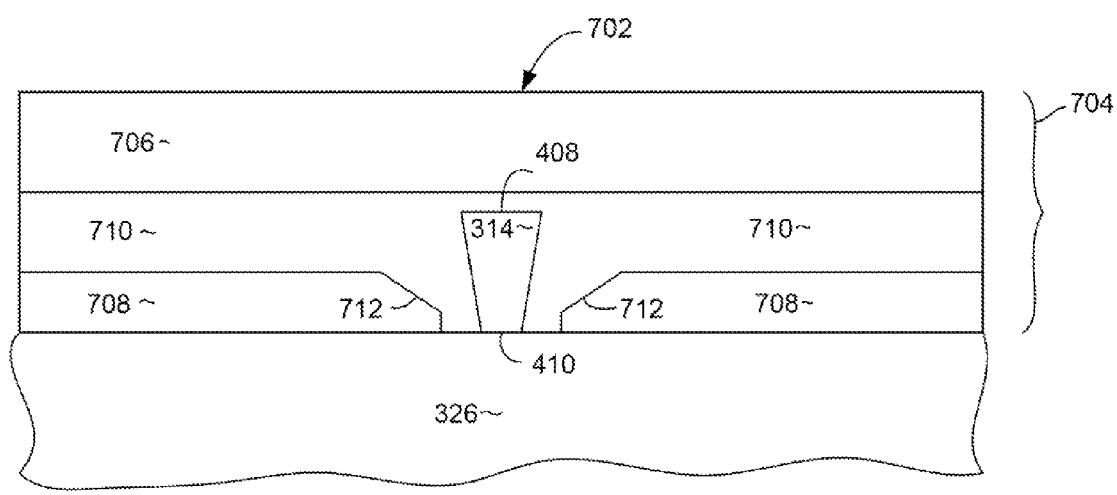
FIG. 7 is an air bearing surface view of a portion of a write head illustrating a trailing wrap around magnetic shield according to still another embodiment of the invention.

With reference now to FIG. 7, in still another embodiment of the invention, a write head 702 has a shield structure 704 that includes a trailing shield portion 706 and a separate, floating side shield structure 708. As can be seen, the floating side shield structure 708 is separated from the trailing portion by a non-magnetic insulation layer 710. The side shield portion 708 may have a tapered inner edge 712 that tapers toward the write pole 314 with increasing distance toward the leading edge 410. Therefore, while the trailing edge of the write pole 314 has virtually no side shielding (form maximum write field at the trailing edge 408) the leading portion of the write pole has side shield protection that increases with increasing distance toward the leading edge 410.

While various embodiments have been described, it should be understood that they have been presented by way of example only, and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A magnetic write head for perpendicular data recording, comprising:
   a magnetic write pole having an end extending to an air bearing surface and having a trailing edge, a leading edge and first and second laterally opposed sides each extending from the trailing edge to the leading edge;
   a magnetic shield structure including a trailing shield portion separated from the trailing edge of the write pole by a non-magnetic trailing gap and a side shield portion, the side shield portion being separated from an adjacent side of the write pole by a non-magnetic side gap, wherein the side shield portion has an inner edge located toward the write pole, the inner edge having a tapered portion adjacent to the trailing edge of the write pole and a straight portion adjacent to the leading edge of the write pole; wherein
   the non-magnetic side gap has a width adjacent to the leading edge of the write pole that is smaller than a width adjacent to the trailing edge of the write pole.

2. A magnetic write head as in claim 1 wherein the side shield portion includes first and second portions, the second portion being in a trailing direction relative to the first portion, and wherein the first portion has an inner end that extends closer to the write pole than an inner end of the second portion.

3. A magnetic write head as in claim 2 wherein the inner end of the first portion and inner end of the second portion form a stepped inner edge structure.

4. A magnetic write head as in claim 2 wherein the first portion is magnetically connected with the second portion.

5. A magnetic write head as in claim 2 wherein the first portion is magnetically connected with the second portion and the second portion is magnetically connected with the trailing portion.

6. A magnetic write head as in claim 2 wherein the first portion has a tapered inner edge disposed toward the write pole, the tapered inner edge being closer to the write pole as it move nearer to the leading edge of the write pole.

7. A magnetic write head as in claim 2 wherein the first portion has a leading edge and a trailing edge and an inner edge disposed toward the write pole that extends from the leading edge of the first portion to the trailing edge of the first portion, and wherein the inner edge is tapered so that it is closer to the write pole at the leading edge of the first portion and further from the write pole at the trailing edge of the first portion.

8. A magnetic write head as in claim 7 wherein the second side shield portion has a non-tapered inner edge located toward the write pole.

9. A magnetic write head as in claim 8 wherein the non-tapered inner edge of the second side shield portions meets the tapered inner edge of the first side shield portion.

10. A magnetic write head as in claim 1 wherein the side gap tapers from a larger side gap adjacent to the trailing edge of the write pole to a smaller side gap adjacent to the leading edge of the write pole.

11. A magnetic write head as in claim 1 wherein the trailing shield portion has a notched structure having an edge that extends toward the trailing edge of the write pole and side portions that extend in a trailing direction.

12. A magnetic write head as in claim 1 wherein the side shield portion is separated from the trailing shield portion by a non-magnetic layer sandwiched therebetween.

13. A magnetic write head as in claim 1 wherein the side shield portion is separated from the trailing shield portion by a non-magnetic layer sandwiched therebetween, the side shield portion having a leading edge that is located at a level of the leading edge of the write pole and a trailing edge that is located at a level that is between the leading edge of the write pole and the trailing edge of the write pole.

14. A magnetic write head as in claim 1 wherein the side shield portion is separated from the trailing shield portion by a non-magnetic layer sandwiched therebetween and wherein the side shield portion has an inner edge with a tapered portion that is further from the write pole in a trailing direction and closer to the write pole in a leading direction.

15. A magnetic write head for perpendicular magnetic data recording, comprising:
a magnetic write pole having an end disposed toward an air bearing surface that has a leading edge, a trailing edge and first and second sides that extend from the leading edge to the trailing edge;
a leading return pole having an end disposed toward the air bearing surface, the write pole and the leading return pole being magnetically connected with one another in a region removed from the air bearing surface;
a trailing, wrap-around magnetic shield structure, wherein the side shield portion has an inner edge located toward the write pole, the inner edge having a tapered portion adjacent to the trailing edge of the write pole and a straight portion adjacent to the leading edge of the write pole; and
a trailing magnetic return pole magnetically connecting the trailing, wrap around shield with the write pole and leading return pole in a region removed from the air bearing surface, wherein
the magnetic trailing shield structure has a trailing shield portion that is separated from the trailing edge of the write pole by a non-magnetic trailing gap, and has a side shield portion that is separated from an adjacent side of the write pole by a side gap that is narrower adjacent to the leading edge of the write pole than it is adjacent to the trailing edge of the write pole.

16. A magnetic write head as in claim 15 wherein the side shield portion includes a first portion and a second portion the second portion being located in a trailing direction relative to the first portion, the first portion and second portion each having an inner edge extending toward the write pole, the inner end of the first portion extending closer to the write pole than the inner end of the second portion.

17. A magnetic write head as in claim 16 wherein the inner edge of the first portion is tapered so as to extend closer to the write pole with increasing distance in the leading direction.

18. A magnetic write head as in claim 16 wherein the inner edge of the first portion is tapered so as to extend closer to the write pole with increasing distance in the leading direction, and wherein the inner edge of the second portion is non-tapered.

19. A magnetic write head as in claim 15 wherein the side shield portion is magnetically connected with the trailing shield portion and the trailing shield portion is magnetically connected with the trailing return pole.

* * * * *

UNITED STATES PATENT AND TRADEMARK OFFICE
CERTIFICATE OF CORRECTION

| | | |
|---|---|---|
| PATENT NO. | : 8,120,874 B2 | Page 1 of 1 |
| APPLICATION NO. | : 11/966023 | |
| DATED | : February 21, 2012 | |
| INVENTOR(S) | : Wen-Chien David Hsiao et al. | |

It is certified that error appears in the above-identified patent and that said Letters Patent is hereby corrected as shown below:

In the Specification:

Column 6, line 56 replace "anon-magnetic" with --a non-magnetic--.

Signed and Sealed this
Seventh Day of July, 2015

Michelle K. Lee
*Director of the United States Patent and Trademark Office*